US 11,396,250 B2

(12) United States Patent
Kondrad et al.

(10) Patent No.: US 11,396,250 B2
(45) Date of Patent: *Jul. 26, 2022

(54) UPPER SEAT BACK ASSEMBLY

(71) Applicant: Ford Global Technologies, LLC, Dearborn, MI (US)

(72) Inventors: Marcos Silva Kondrad, Macomb Township, MI (US); Kevin Mozurkewich, Milford, MI (US); Kevin Wayne Preuss, Berkley, MI (US); Ryan Welch, Ottawa Lake, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,159

(22) Filed: May 13, 2021

(65) Prior Publication Data
US 2021/0268948 A1 Sep. 2, 2021

Related U.S. Application Data

(63) Continuation of application No. 16/593,073, filed on Oct. 4, 2019, now Pat. No. 11,027,634.

(51) Int. Cl.
*B60N 2/58* (2006.01)
*B60N 2/64* (2006.01)
*B60N 2/68* (2006.01)
*B60N 2/80* (2018.01)

(52) U.S. Cl.
CPC .............. *B60N 2/5825* (2013.01); *B60N 2/64* (2013.01); *B60N 2/68* (2013.01); *B60N 2/80* (2018.02); *B60N 2205/30* (2013.01)

(58) Field of Classification Search
CPC .......... B60N 2/5825; B60N 2/64; B60N 2/68; B60N 2/80; B60N 2205/30
See application file for complete search history.

(56) References Cited

U.S. PATENT DOCUMENTS

| | | |
|---|---|---|
| 4,065,182 A | 12/1977 | Braniff |
| 5,568,961 A | 10/1996 | Colasanti |
| 5,791,738 A | 8/1998 | Niezoldt |
| 6,059,369 A | 5/2000 | Bateson |
| 6,637,822 B1 | 10/2003 | Kato |
| 6,899,399 B2 | 5/2005 | Alli et al. |

(Continued)

FOREIGN PATENT DOCUMENTS

| | | |
|---|---|---|
| FR | 3061457 A1 | 5/2019 |
| WO | 2011088167 A1 | 7/2011 |

(Continued)

*Primary Examiner* — Rodney B White
(74) *Attorney, Agent, or Firm* — Vichit Chea; Price Heneveld LLP (57) ABSTRACT

A seat back frame assembly may include first and second brackets coupled with and extending outwardly from the seat back frame assembly. The first and second brackets may define first and second recesses, respectively. A cushion assembly may include first and second sides. The first and second sides may be disposed within the first and second recesses, respectively. An upper hood comprising first and second ends may be coupled with first and second brackets, respectively.

20 Claims, 11 Drawing Sheets

(56) References Cited

U.S. PATENT DOCUMENTS

| | | | |
|---|---|---|---|
| 7,946,649 B2 | 5/2011 | Galbreath et al. | |
| 10,399,472 B2 | 9/2019 | Iwakata | |
| 11,027,634 B2 * | 6/2021 | Kondrad | B60N 2/688 |
| 2002/0047297 A1 | 4/2002 | Longhi | |
| 2005/0093352 A1 | 5/2005 | Yasuda | |
| 2010/0264717 A1 | 10/2010 | Fukuda | |
| 2011/0169317 A1 | 7/2011 | Fujita | |
| 2012/0049587 A1 | 3/2012 | Suzuki | |
| 2012/0217775 A1 | 8/2012 | Fujita | |
| 2015/0108820 A1 | 4/2015 | Fujita | |
| 2015/0232008 A1 | 8/2015 | Zimmerbeutel | |
| 2016/0311351 A1 | 10/2016 | Mizobata | |
| 2017/0080832 A1 | 3/2017 | Fujita | |
| 2018/0118067 A1 | 5/2018 | Line | |
| 2018/0257522 A1 | 9/2018 | Won | |
| 2018/0279791 A1 | 10/2018 | Iwakata | |
| 2018/0281645 A1 | 10/2018 | Tokumoto | |
| 2018/0334060 A1 | 11/2018 | Yamabe | |
| 2020/0079258 A1 | 3/2020 | Kikuchi | |

FOREIGN PATENT DOCUMENTS

| | | |
|---|---|---|
| WO | 2014077387 A1 | 5/2014 |
| WO | 2014127355 A1 | 8/2014 |
| WO | 2015178359 A1 | 4/2017 |
| WO | 2018060825 A1 | 4/2018 |
| WO | 2019082876 A1 | 5/2019 |

* cited by examiner

ABSTRACT

UPPER SEAT BACK ASSEMBLY

CROSS-REFERENCE TO RELATED APPLICATION

This present application is a continuation of U.S. patent application Ser. No. 16/593,073, filed Oct. 4, 2019, now U.S. Pat. No. 11,027,634, entitled "UPPER SEAT BACK ASSEMBLY," the disclosure of which is hereby incorporated herein by reference in its entirety.

FIELD OF THE DISCLOSURE

The present disclosure generally relates to an upper seat back assembly, and more specifically, to an upper seat back assembly having brackets extending outwardly from a seat back.

BACKGROUND OF THE DISCLOSURE

Seating assemblies provided in motor vehicles are designed to provide a support platform for accommodating an occupant in a seated position. When such seating assemblies are installed in motor vehicles, it is desirable for the seating assembly to demonstrate quality and craftsmanship in manufacture and assembly.

SUMMARY OF THE DISCLOSURE

According to one aspect of the present disclosure, a vehicle seating assembly includes a frame defining an upper seat back. First and second brackets are coupled with the upper seat back. The first and second brackets extend outwardly from the upper seat back and define first and second recesses, respectively. A cushion assembly extends across the upper seat back. The cushion assembly includes first and second sides. The first and second sides are disposed within the first and second recesses, respectively. The first and second sides each define a groove configured to receive the first and second brackets, respectively. An upper hood extends across the upper seat back. The upper hood includes first and second ends coupled with the first and second brackets, respectively.

Embodiments of the first aspect of the disclosure can include any one or a combination of the following features:
  wherein the first and second brackets each define a locating hole and the first and second ends of the upper hood assembly are fastened to the first and second brackets with fasteners positioned in the locating holes;
  further including a headrest coupled to the upper hood;
  wherein the first and second brackets each include a U-shaped wire portion defining the first and second recesses, respectively;
  wherein the wire portions comprise a metal and the first and second wing portions of the first and second brackets comprise a polymeric material;
  wherein upper hood further comprises first and second wing portions configured to couple the wire portion of the first and second brackets;
  wherein the first and second brackets further comprise wing portions configured to couple the grooves in the cushion assembly;
  wherein the wing portions each include a V-shape configured to nest within the grooves;
  wherein the first and second brackets each include a wire portion defining the first and second recesses and the wing portions comprise at least one coupling configured to receive the wire portions;
  wherein the couplings define channels to accommodate the wire portions; and
  wherein the upper hood includes supports that extend on both sides of the head restraint.

According to another aspect of the present disclosure, a seating assembly includes a frame defining an upper seat back. First and second brackets are coupled with the upper seat back. The first and second brackets define first and second recesses, respectively. A cushion assembly includes first and second sides. The first and second sides are disposed within the first and second recesses, respectively. The first and second sides each define a groove configured to receive the first and second brackets, respectively. An upper hood includes first and second ends coupled with the first and second brackets, respectively.

Embodiments of the second aspect of the disclosure can include any one or a combination of the following features:
  wherein the first and second brackets each define a locating hole and the first and second ends of the upper hood assembly are fastened to the first and second brackets with fasteners positioned in the locating holes;
  further comprising a headrest coupled to the upper hood;
  wherein the first and second brackets each include a U-shaped wire portion defining the first and second recesses, respectively; and
  wherein the first and second brackets each comprise wing portions configured to nest within the grooves of the first and second sides of the cushion assembly, respectively.

According to another aspect of the present disclosure, a seat back frame assembly includes first and second brackets coupled with and extending outwardly from the seat back frame assembly. The first and second brackets define first and second recesses, respectively. A cushion assembly includes first and second sides. The first and second sides are disposed within the first and second recesses, respectively. An upper hood includes first and second ends coupled with first and second brackets, respectively.

Embodiments of the third aspect of the disclosure can include any one or a combination of the following features:
  wherein the first and second brackets each include a U-shaped wire portion defining the first and second recesses;
  wherein the first and second brackets include wing portions configured to nest within the first and second sides of the cushion assembly, respectively; and
  further including a headrest coupled to the upper hood and defining a head restraint interface.

These and other aspects, objects, and features of the present disclosure will be understood and appreciated by those skilled in the art upon studying the following specification, claims, and appended drawings.

DETAILED DESCRIPTION

Figure 1:
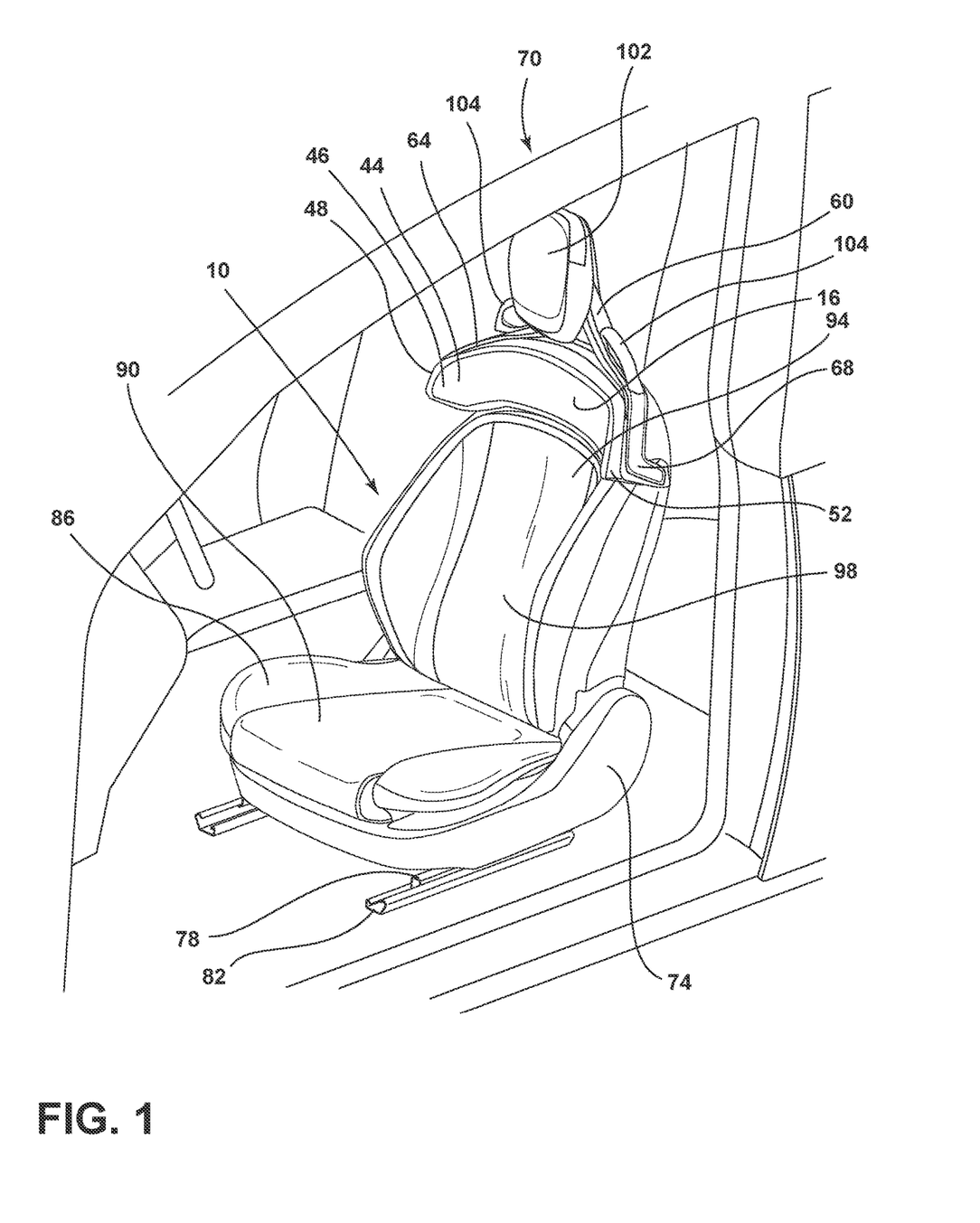
FIG. 1 is a top perspective view of a seating assembly, of the present disclosure, positioned inside a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-7, reference number 10 generally designates a vehicle seating assembly including a frame 14 that defines an upper seat back 16. First and second brackets 20, 24 are coupled with the upper seat back. The first and second brackets 20, 24 extend outwardly from the upper seat back 16 and define first and second recesses 28, 32, respectively. The first and second brackets 20, 24 include first and second wing portions 36, 40, respectively. The vehicle seating assembly 10 also includes a cushion assembly 44 that extends across the upper seat back 16. The cushion assembly 44 includes first and second sides 48, 52. The first and second sides 48, 52 are disposed within the first and second recesses 28, 32, respectively. The first and second sides 48, 52 each define a groove 56 configured to receive the first and second wing portions 36, 40, respectively. Furthermore, an upper hood 60 extends across the upper seat back 16 of the vehicle seating assembly 10. The upper hood 60 includes first and second ends 64, 68 coupled with the first and second wing portions 36, 40, respectively.

With reference to FIG. 1, the vehicle seating assembly 10 may be used in any vehicle 70, such as a car, a truck, a van, etc. It is also contemplated that the concept set forth in this disclosure may be utilized in a front or forward position of the vehicle 70 as well as a rear or rearward position of the vehicle 70. The vehicle seating assembly 10, as illustrated, includes the frame 14 (FIG. 2) and a seat base 74 that may be positioned on rail slides 78 that slide on rails 82 to allow fore and aft movement of the vehicle seating assembly 10 relative to the vehicle 70. A seat 86 may be operably coupled with the seat base 74 and movable relative thereto. The seat 86 includes a seat cushion assembly 90 supported thereon, and which defines a seating surface. The seat cushion assembly 90 may integral with, or separate from, the cushion assembly 44, which may define an upper body surface. The cushion assembly 44 may include a foam, such as an expanded polypropylene foam, which may be covered in a trim 46 such as cloth, leather, etc. Moreover, a seat back 94 of the vehicle seating assembly 10 includes the upper seat back 16 that corresponds to an upper thoracic region, and a lower seat back 98 that corresponds to a lower lumbar region, as well as the upper hood 60 and a head restraint 102. The upper hood 60 and the head restraint 102 may define a head restraint interface. In some examples, the upper hood 60 may include handles 104. The seat back 94 may be pivotally coupled to the seat base 74. Each of the components of the seat back 94 may be configured for adjustability to properly support the weight of various occupants of various sizes inside the vehicle 70.

Figure 2:
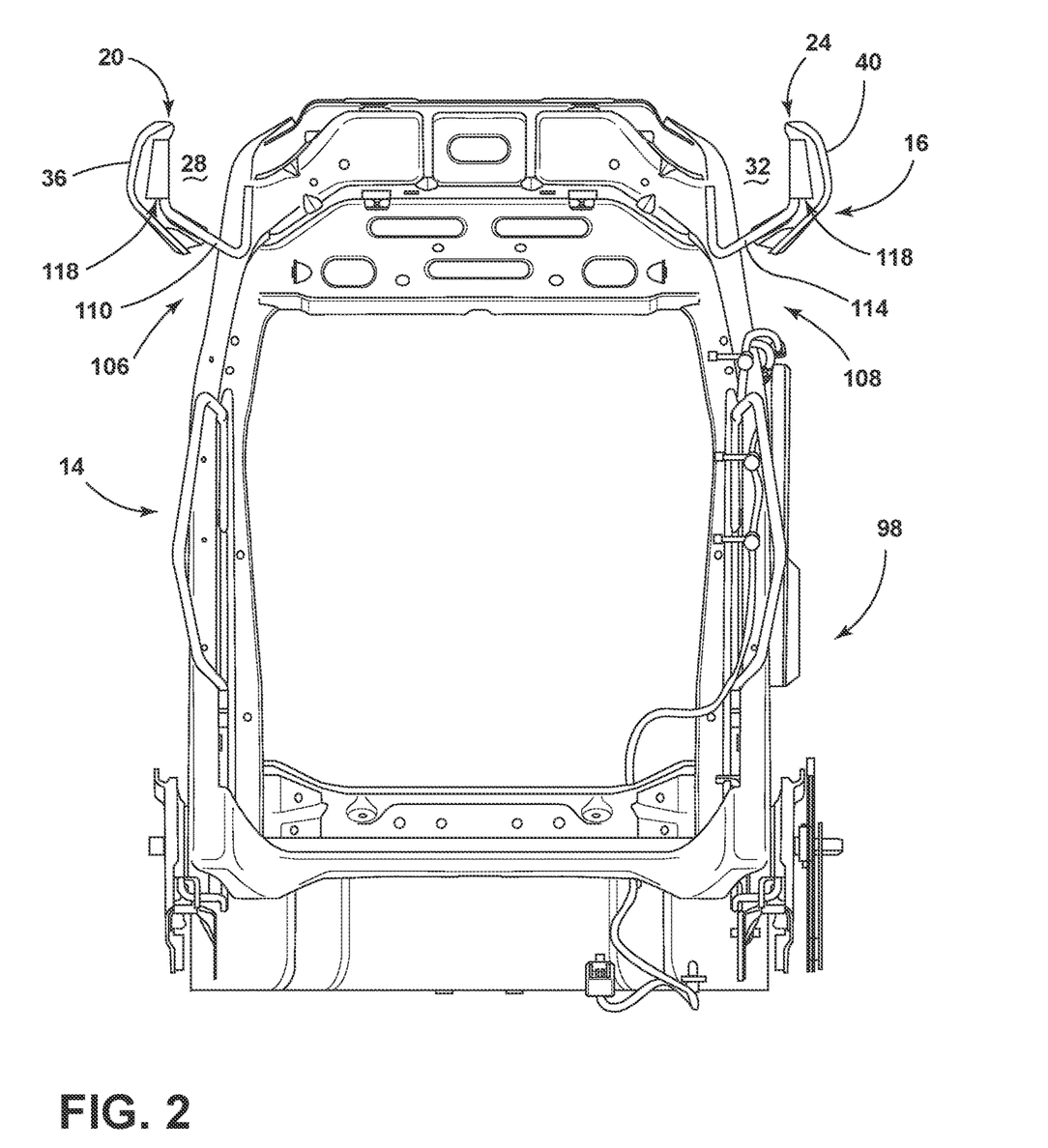
FIG. 2 is a front elevational view of a seat back frame of the present disclosure.

Referring now to FIG. 2, the frame 14 defining the upper seat back 16 and the lower seat back 98 is illustrated. The first and second brackets 20, 24 may extend outwardly from first and second sides 106, 108 of the frame 14, respectively. The first and second brackets 20, 24 may include wire portions 110, 114, defining the first and second recesses 28, 32. The wire portions 110, 114 may be coupled with the first and second wing portions 36, 40, respectively. While described as wires, the wire portions 110, 114 may include any suitable material to define the first and second recesses 28, 32, which may include metal or plastic. In some examples, the wire portions 110, 114 and the first and second wing portions 36, 40 are integral and form single pieces. For example, the wire portions 110, 114 and the first and second wing portions 36, 40 may be formed by injection molding. As such, the first and second wing portions 36, 40 may include any suitable material, which may also include polymer, plastic or metal. Furthermore, the wire portions 110, 114 may be coupled with the frame 14 in any suitable manner, which may include the use of fasteners, welding, and/or insertion into an aperture defined by the frame 14, etc.

Figure 3:
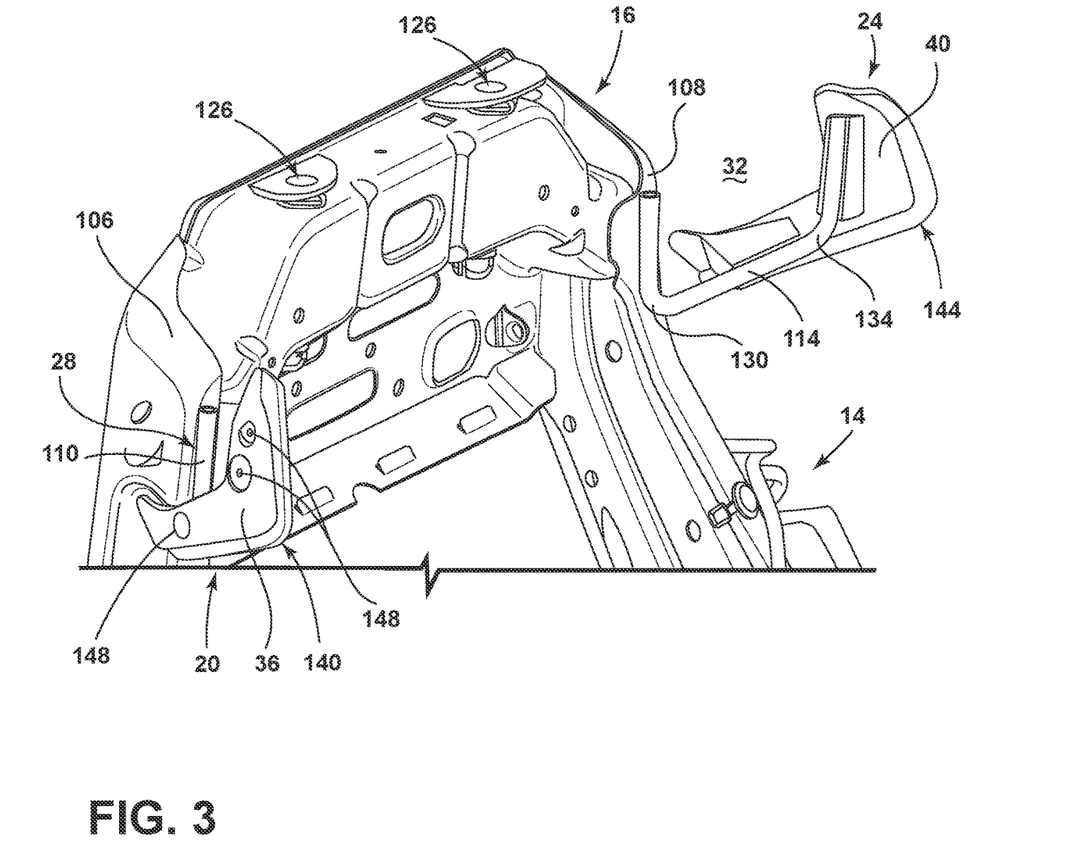
FIG. 3 is a partial top perspective view of the upper seat back frame of FIG. 2.
Figure 9:
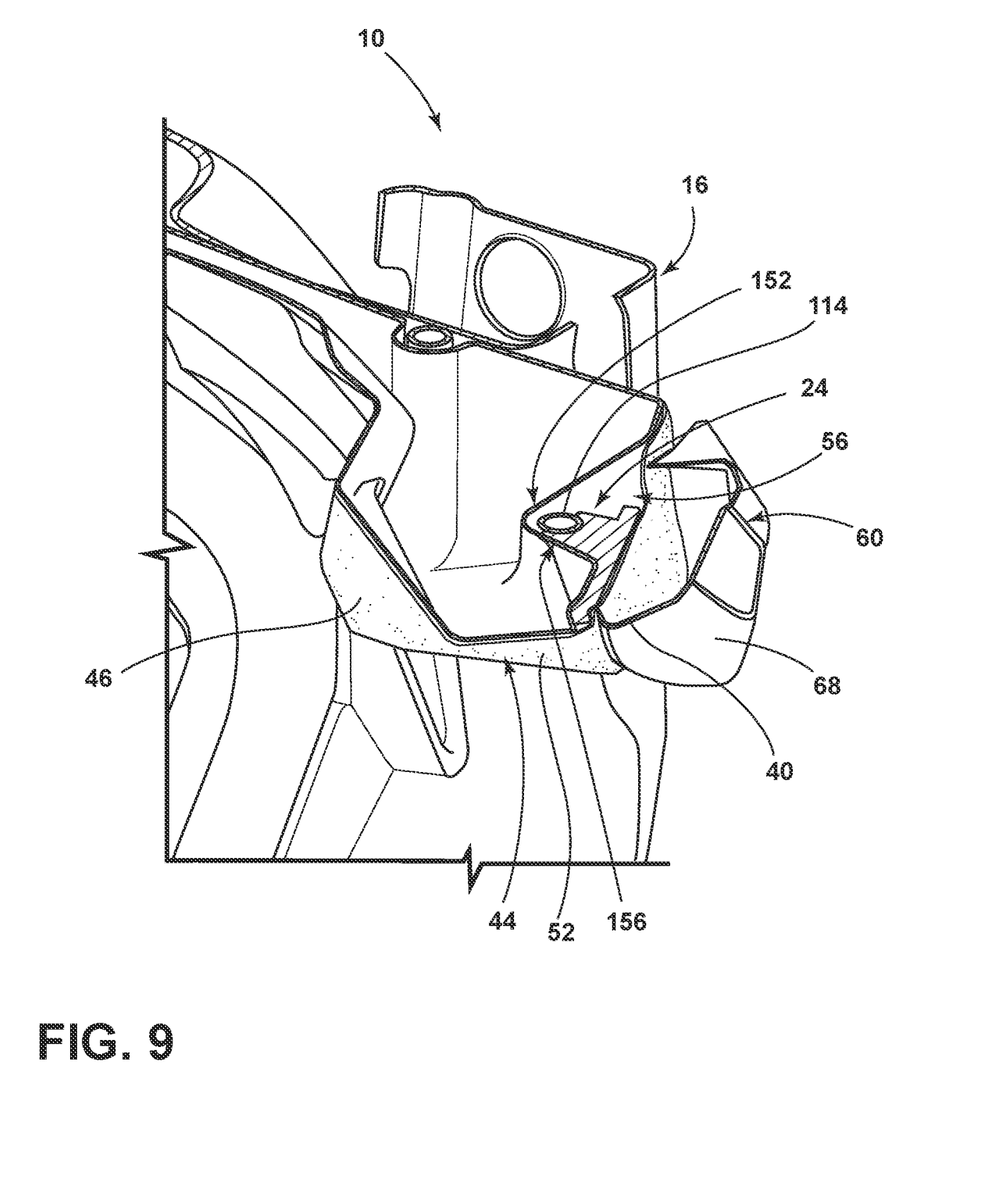
FIG. 9 is a top cross-sectional view of a portion of the seat back of FIG. 8.

FIG. 3 illustrates the upper seat back 16 portion of the frame 14 in more detail. The frame 14 may include shafts 122 (FIG. 5) defining channels 126 configured to receive the upper hood 60 (FIG. 9). In some examples, the wire portions 110, 114 are generally U-shaped and may include bent sections 130, 134. The bent sections 130, 134 may define a substantially 90 degree curvature. Alternatively, the wire portions 110, 114 may be any suitable shape for accommodating the first and second sides 48, 52 of the cushion assembly 44, which may include semi-circular or V-shaped. The first and second wing portions 36, 40 may taper to form points 140, 144, thereby forming a V-shape pointing away from the first and second sides 106, 108 of the frame 14. Furthermore, locating holes, 148 may be formed on the first and second wing portions 36, 40 to position the upper hood 60 relative to the first and second brackets 20, 24 with a fastener. The locating holes 148 may be counterbored, spotfaced, etc. to provide a smooth surface for the fastener. In some examples, the locating holes 148 include a 10 millimeter counterbore.

Figure 4A:
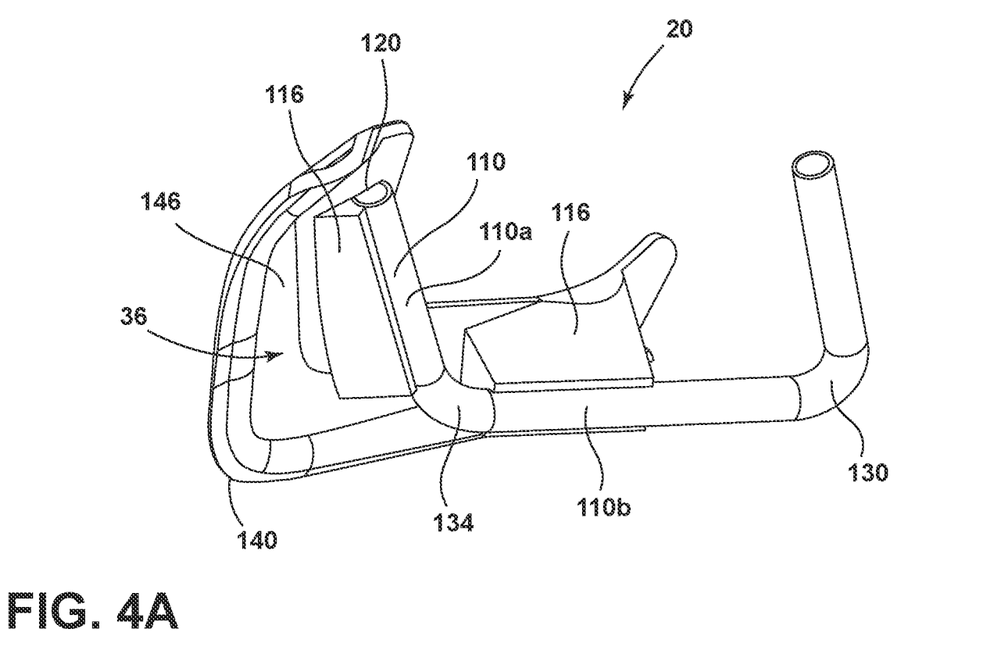
FIG. 4A is a top perspective view of a bracket of the present disclosure.

Referring now to FIG. 4A, the first bracket 20 is more clearly illustrated. The first and second wing portions 36, 40 of the first and second brackets 20, 24 may define couplings 116 configured to receive the wire portions 110, 114 to operably couple the wire portions 110, 114 and the corresponding one of the first and second wing portions 36, 40. The couplings 116 may be in the form of a projection extending from an inner surface 146 of the wing portion 36. In some examples, the wing portion 40 includes a pair of couplings 116 offset from each other in order to receive an end 110a and a middle 110b of the wire portion 110. Offset may include generally perpendicular such that the bent section 134 is positioned between the pair of couplings 116. Furthermore, the coupling 116 accommodating the end 110a of the wire portion 110 may be recessed into the inner surface 146 to define a stop 120. The stop 120 may engage a distal end of the end 110a to aid in securing the wire portion 110.

Figure 4B:
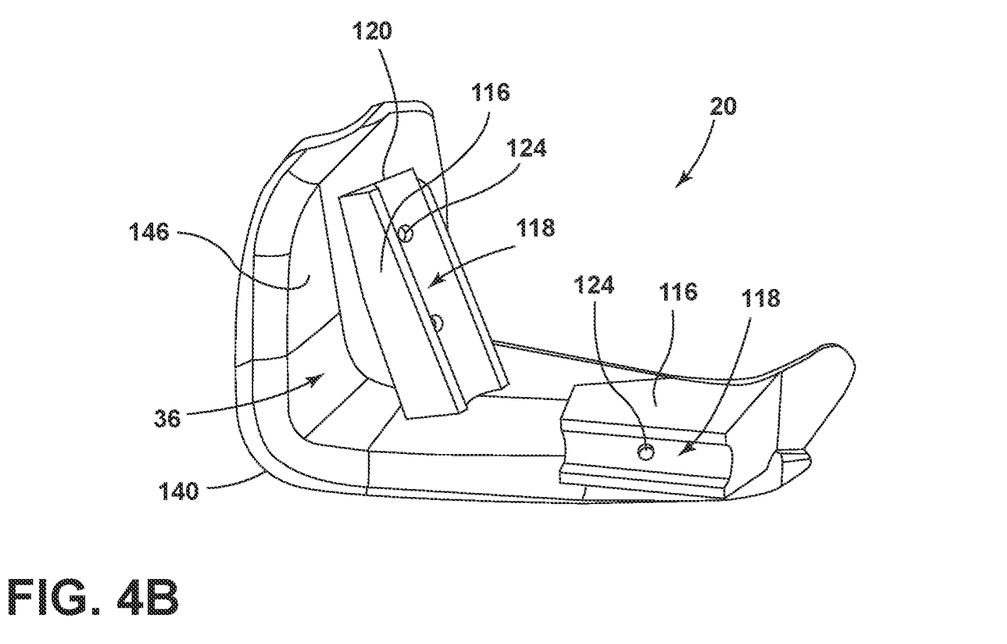
FIG. 4B is a front elevational view of a wing portion of the present disclosure.

FIG. 4B more clearly illustrates the couplings 116 without the wire portion 110 of the first bracket 20. The couplings 116 may define channels 118, which may be semi-circular to accommodate the wire portions 110, 114. Alternatively, channels 118 may be in the form of a circular channel or any other suitable surface for attaching the wire portions 110, 114. Additionally, the couplings 116 may include through holes 124 configured to receive a fastener. The wire portions 110, 114 may include threaded holes that may be aligned with the through holes 124 and configured to receive the fastener to couple the wire portions 110, 114 and the corresponding one of the first and second wing portions 36, 40. Alternatively, the wire portions 110, 114 may be welded or otherwise fastened to the wing portions 36, 40 with or without couplings 116.

Figure 5:
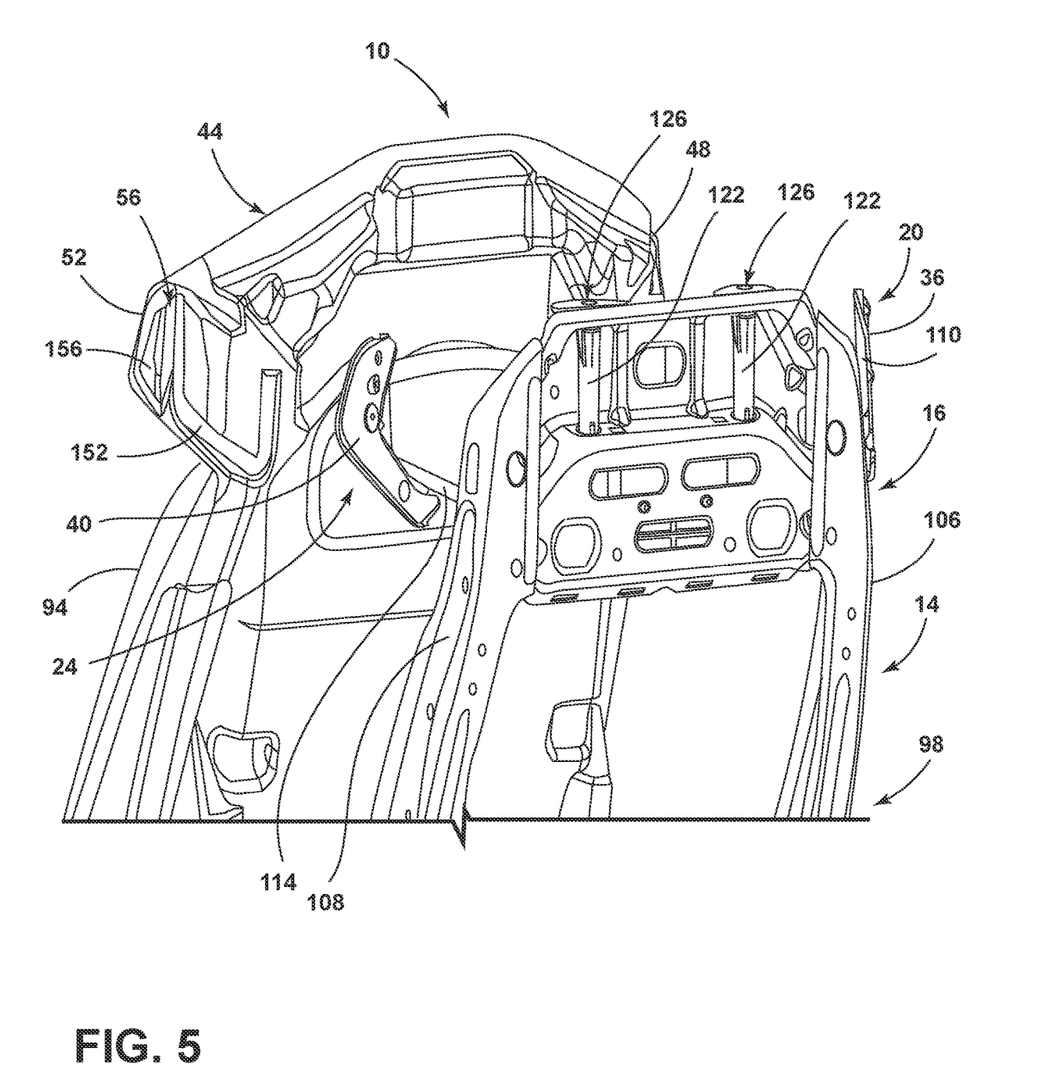
FIG. 5 is a partial rear exploded view of the seat back frame and a cushion of the present disclosure.

Referring now to FIG. 5, the groove 56 on the second side 52 of the cushion assembly 44 configured to receive the second wing portion 40 is more clearly illustrated. The cushion assembly 44 may be constructed of any suitable material configured to retain the contour of the grooves 56, which may include a foam. The groove 56 may define a first recessed area 152 configured to mate with, or receive the wire portion 114 and a second recessed area 156 configured to mate with, or receive the second wing portion 40. In this way, the groove 56 includes a complementary shape in the form of a pocket to encompass the second bracket 24. Thus, the second bracket 24 may be configured to nest within the groove 56 of the second side 52 of the cushion assembly 44, which is illustrated in at least FIG. 6.

Figure 6:
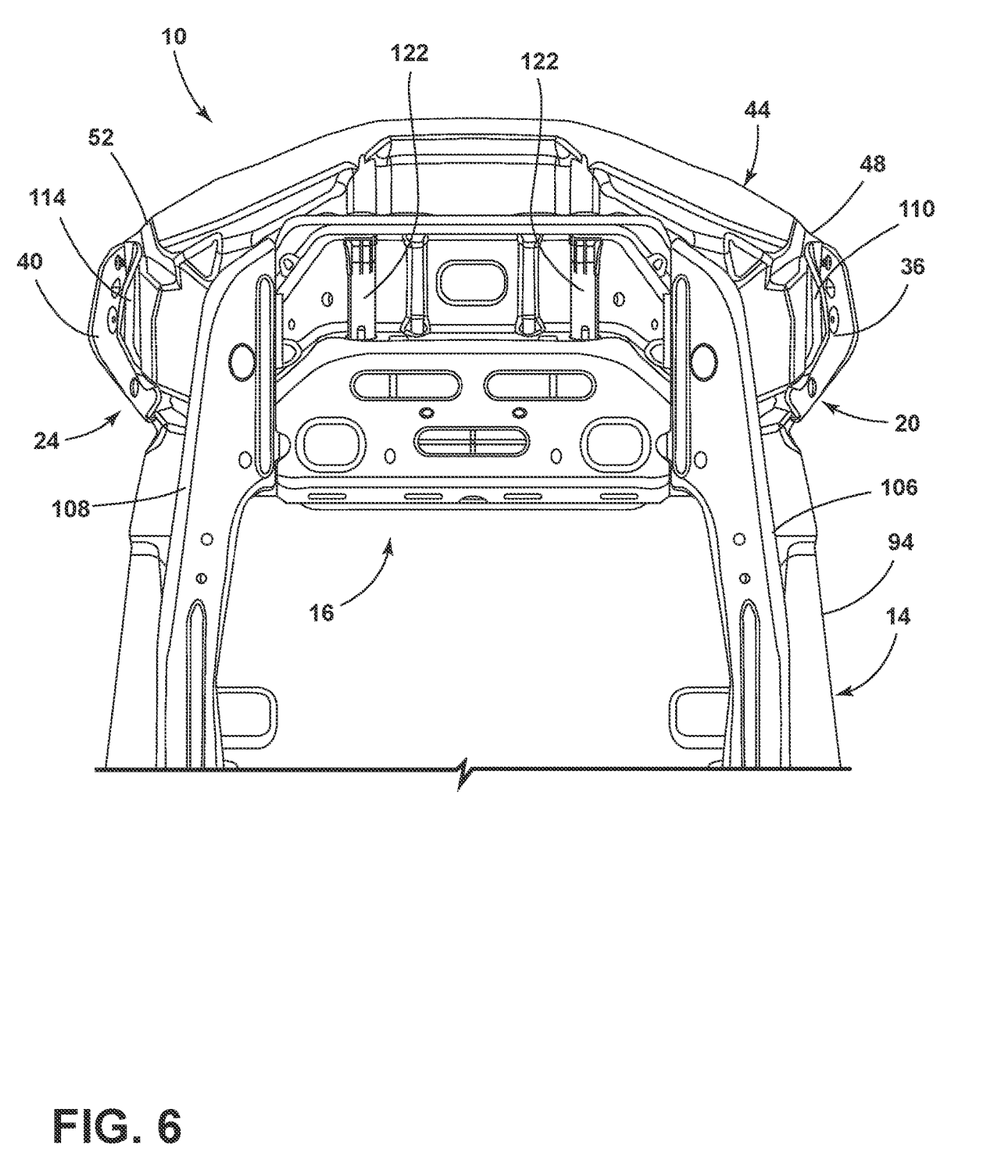
FIG. 6 is a partial rear elevational view of the seat back frame with the cushion of FIG. 5.

Referring now to FIG. 6, the description with respect to the groove 56 on the second side 52 of the cushion assembly 44 and the second wing portion 40 applies to the groove 56 on the first side 48 of the cushion assembly 44 and the first wing portion 36. Therefore, the first bracket 20 may be configured to nest within the groove 56 of the first side 48 of the cushion assembly 44. The cushion assembly 44 may wrap around, or extend across, the upper seat back 16 and may be disposed within the first and second recesses 28, 32 (FIG. 2) to couple the cushion assembly 44 with the frame 14. In this way, the first and second sides 48, 52 of the cushion assembly 44 may be supported at least by the wire portions 110, 114, respectively. It is within the scope of the disclosure for the cushion assembly 44 to be of any suitable shape, which may include being an integral or separate portion from a cushion assembly coupled to the seat back 94.

Figure 7:
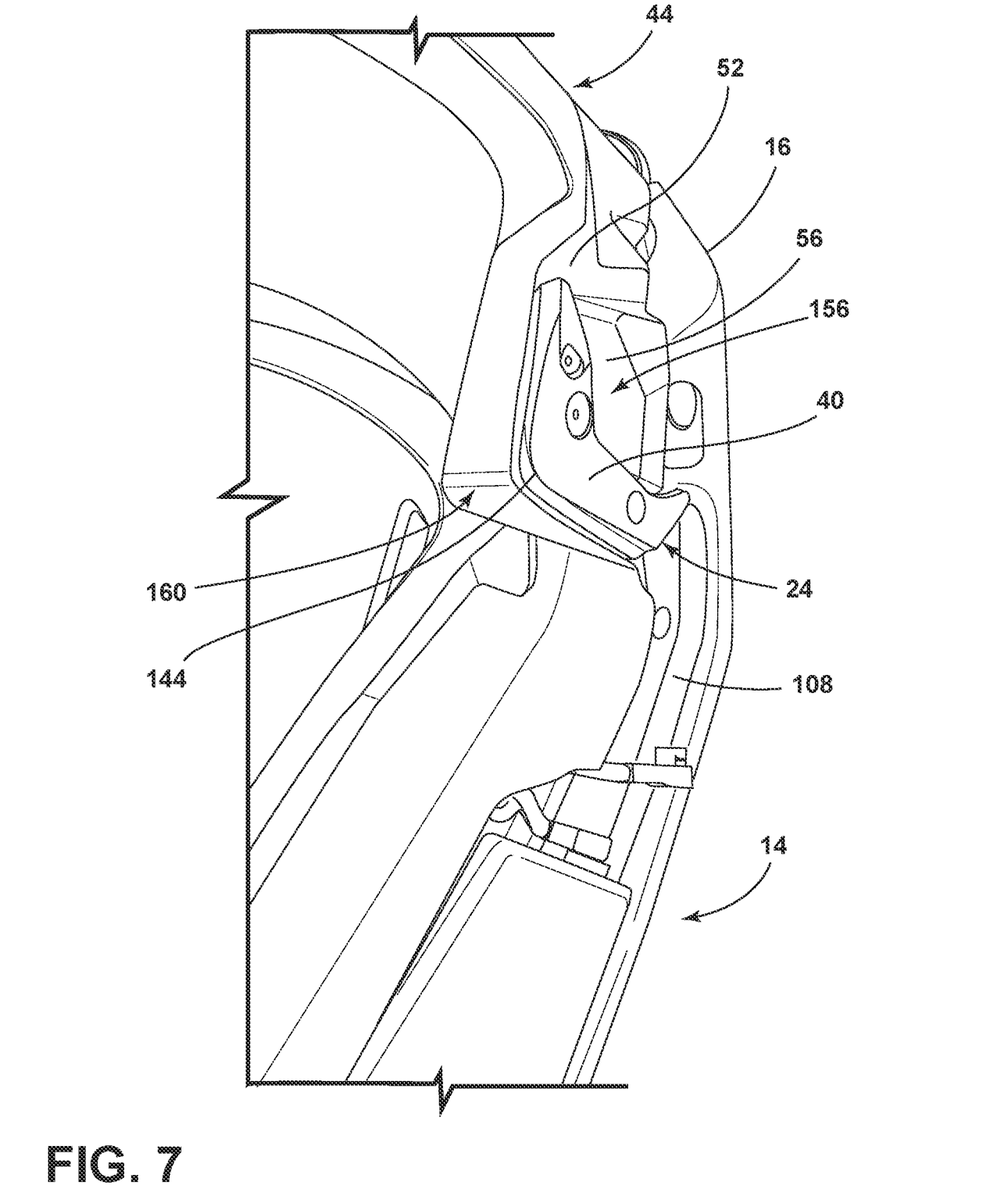
FIG. 7 is a partial top perspective view of the seat back frame with the cushion of FIG. 6.

FIG. 7 illustrates more clearly the second bracket 24 nested within the groove 56 of the second side 52 of the cushion assembly 44. As such, the cushion assembly 44 may be supported by the upper seat back 16 and the first and second brackets 20, 24. The first and second wing portions 36, 40 may be sized to support an outwardly extending corner 160 of each of the first and second sides 48, 52. The shape of the upper seat back 16 may be maintained by support from the first and second brackets 20, 24. In this way, the shape, or contour, of the upper seat back 16 may be generally defined by the first and second brackets 20, 24. As such, sharp edge contours, including the corner 160, for the cushion assembly 44 may be achieved.

Figure 8:
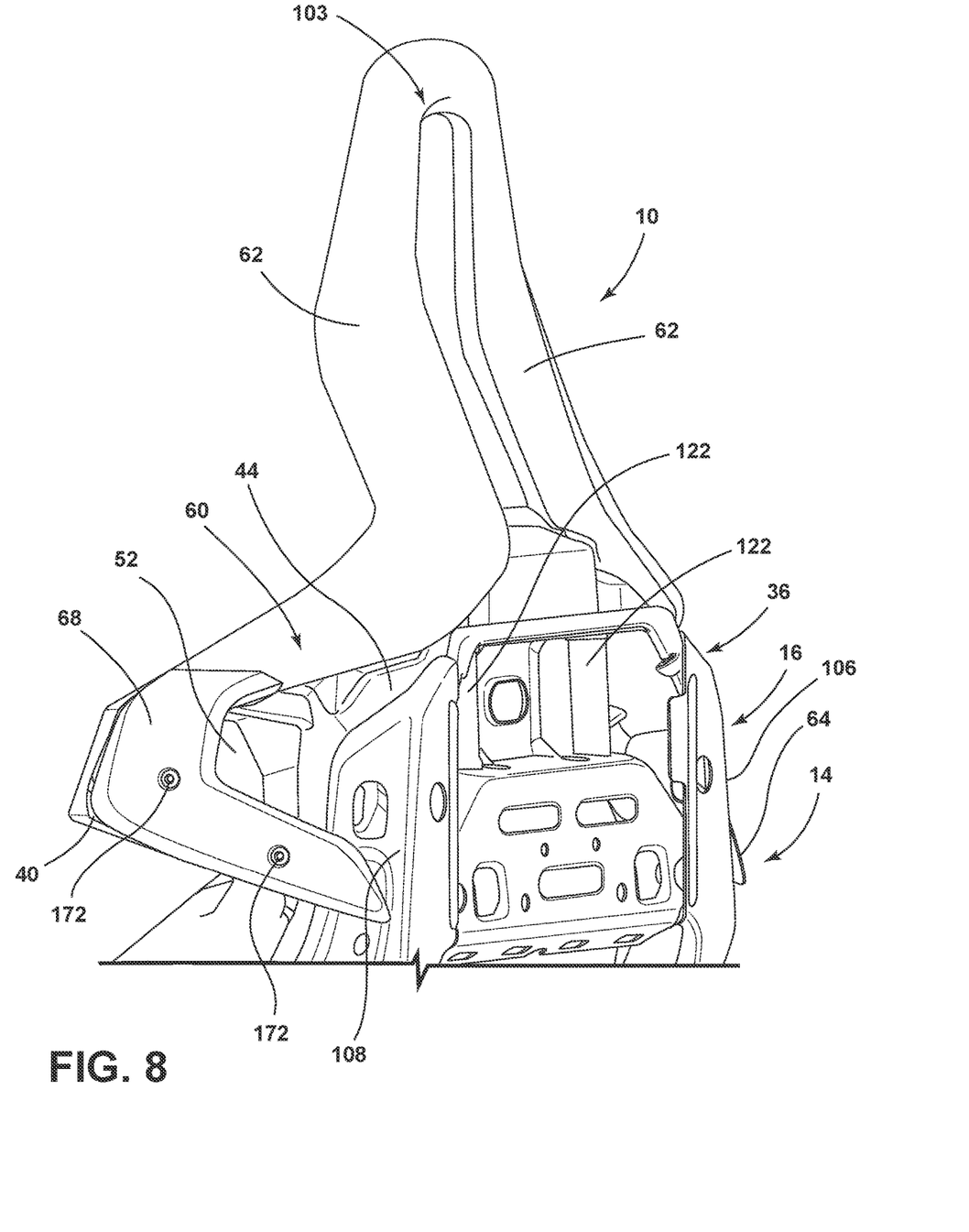
FIG. 8 is a rear perspective view of a seat back of the present disclosure with an upper hood.

Referring now to FIG. 8, the upper hood 60 is mounted to the vehicle seating assembly 10, thereby sandwiching the cushion assembly 44 in place. The upper hood 60 may define supports 62 that extend from both sides of a head restraint interface 103. The head restraint 102 (FIG. 1) may be mounted to the head restraint interface 103, or may be integral with the head restraint interface 103. The supports 62 may terminate in the first end 64 and the second end 68. The first end 64 may be coupled with the first wing portion 36 and the second end 68 may be coupled with the second wing portion 40. The first and second ends 64, 68 of the upper hood 60, which may be in the form of wings, may include locating holes 172 configured to align with the locating holes 148 (FIG. 3) in order to position and mount the upper hood 60 to the first and second brackets 20, 24. In some examples, the first and second ends 64, 68 may substantially cover the first and second brackets 20, 24. Furthermore, at least the first and second ends 64, 68 of the upper hood 60 may include a hard plastic, or any other suitable material for providing a rigid structure to couple with the first and second brackets 20, 24.

FIG. 9 illustrates more clearly the upper hood 60 mounted to the second bracket 24. As shown in FIG. 9, the first recessed area 152 and the second recessed area 156 of the groove 56 may converge and form a V-shaped cross-section to accommodate the wire portion 114 and the wing portion 40 of the second bracket 24. The first and second brackets 20, 24 provide support to couple the upper hood 60 and the cushion assembly 44. The trim 46 may wrap around, or encase, the cushion assembly 44 and at least a portion of the first and second brackets 20, 24, which may include the first and second wing portions 36, 40. As such, a gap between the cushion assembly 44 and the upper hood 60, or lack thereof, may be controlled such that bending, or pulling of the cushion assembly 44 away from the upper hood 60 is significantly reduced. Therefore, the upper seat back 16 includes a structure having tight tolerances for maintaining a consistent gap between the cushion assembly 44, the first and second brackets 20, 24 and the upper hood. Thus, the upper seat back 16 maintains excellent craftsmanship.

Figure 10:
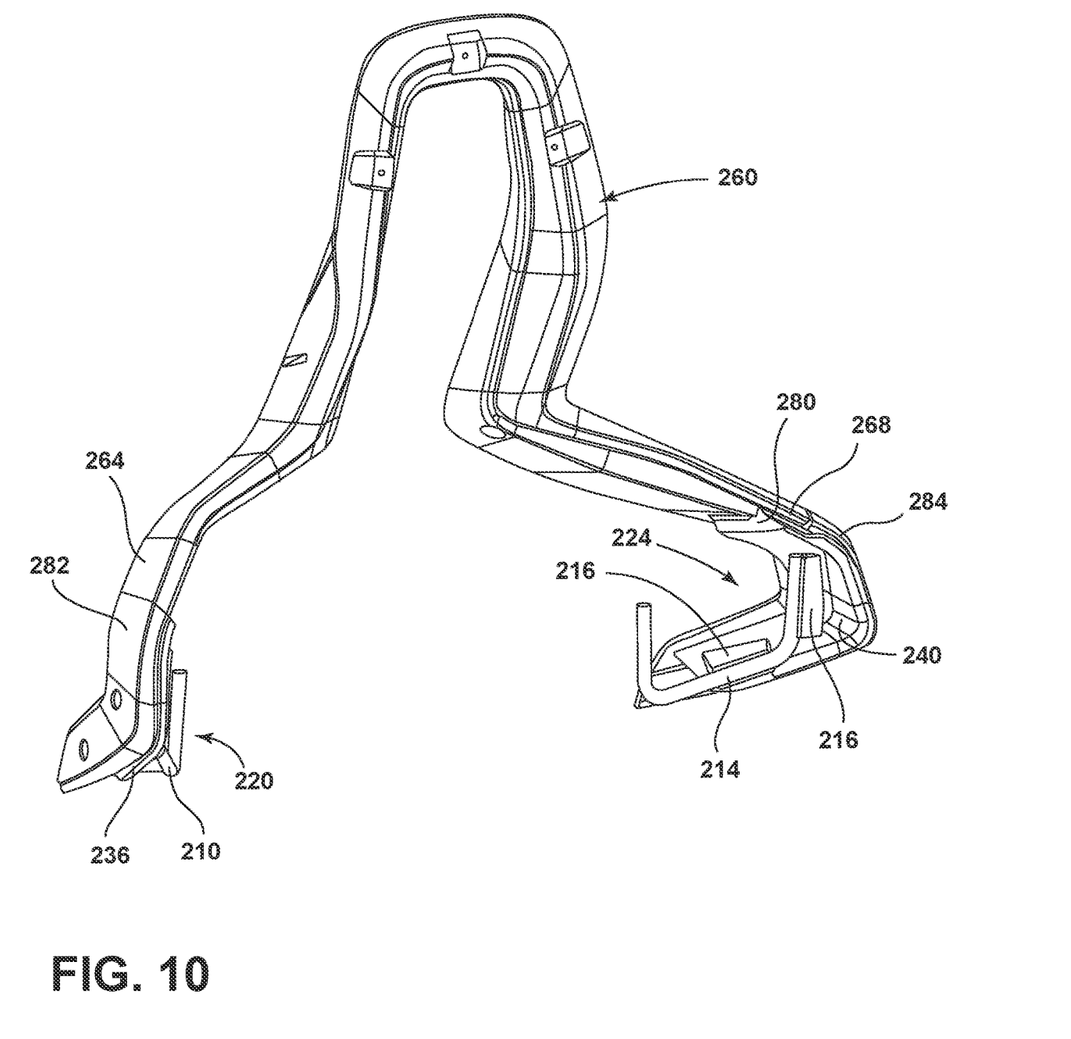
FIG. 10 is a perspective view of an upper hood according to various aspects described herein.

Referring now to FIG. 10, another exemplary embodiment of an upper hood 260 is illustrated. The upper hood 260 is similar to the upper hood 60. However, the upper hood 260 includes first and second brackets 220, 224 integral with first and second ends 264, 268 of the upper hood 260. Moreover, first and second brackets 220, 224 are similar to the first and second brackets 20, 24 and also include first and second wing portions 236, 240. The upper hood 260 may include first and second end caps 282, 284 configured to couple with the first and second brackets 220, 224. The first and second end caps 282, 284 may provide stability to the first and second brackets 220, 224, including a cushion assembly, such as cushion assembly 44 placed therein.

Figure 11A:
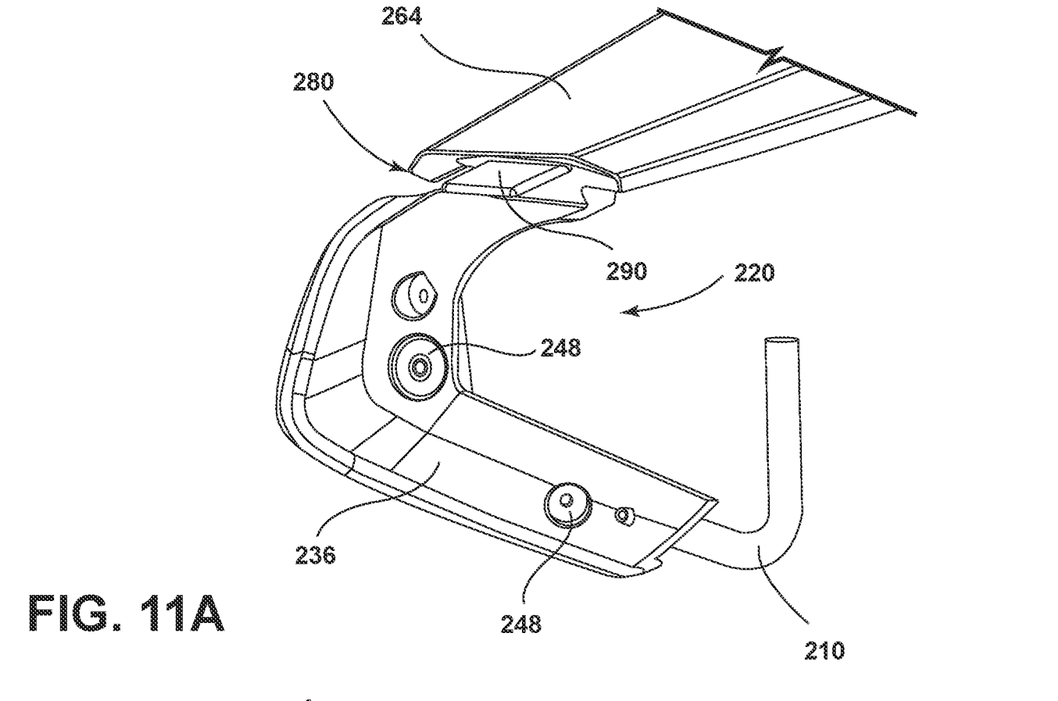
FIG. 11A is a partial view of the upper hood of FIG. 10.

FIG. 11A illustrates an outer side of the first bracket 220 on the first end 264 of the upper hood 260. The description with respect to the first bracket 220 also applies to the second bracket 224. Here, the first bracket 220 and the first end 264 are joined at a connecting portion 280. The connecting portion 280 may include a tab 290. The tab 290 may be received within a slot on the end cap 282 to connect the end cap 282 to the first bracket 220. Furthermore, locating holes 248 may be formed on the first wing portion 236 to position the first end cap 282 relative to the first bracket 220 with a fastener. However, it is within the scope of the disclosure for the first and second end caps 282, 284 to be coupled with the upper hood 260 in any suitable manner, which may include integrally forming the first and second end caps 282, 284 with the first and second brackets 220, 224 and/or the upper hood 260.

Figure 11B:
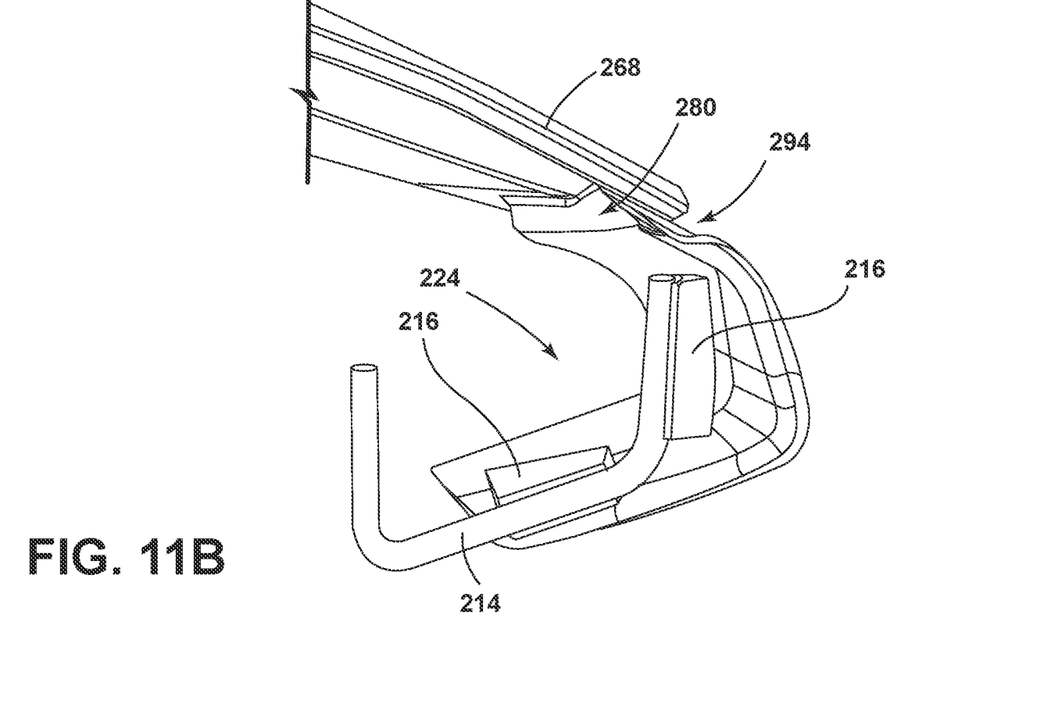
FIG. 11B is a partial view of the upper hood of FIG. 10.

FIG. 11B illustrates an inner side of the second bracket 224 on the second end 268 of the upper hood 260. In some examples, the connecting portion 280 extends downwardly from the second end 268, thereby forming a gap 294. The gap 294 may be beneficial to form a flush surface when the end cap 284 is coupled with the second bracket 224. Couplings 216 may be provided on an inner surface 246 of the wing portion 240 and may be substantially similar to the couplings 116 previously discussed.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle seating assembly, comprising:
   a frame defining an upper seat back;
   an upper hood extending across the upper seat back, the upper hood comprising first and second ends; and
   first and second brackets integral with the first and second ends of the upper hood, respectively, wherein the first and second brackets include first and second wing portions, respectively.

2. The vehicle seating assembly of claim 1, wherein the first and second wing portions each define a locating hole.

3. The vehicle seating assembly of claim 1 further comprising:
   a headrest coupled to the upper hood.

4. The vehicle seating assembly of claim 1, wherein the first and second brackets each comprise a U-shaped wire portion defining first and second recesses, respectively.

5. The vehicle seating assembly of claim 4, wherein the wire portions comprise a metal and the wing portions of the first and second brackets comprise a polymeric material.

6. The vehicle seating assembly of claim 1, wherein the first and second brackets are joined at connecting portions with the first and second ends of the upper hood, respectively.

7. The vehicle seating assembly of claim 6, wherein the connecting portions include tabs.

8. The vehicle seating assembly of claim 1, further comprising:
   a cushion assembly comprising first and second sides, wherein the first and second sides each define a groove configured to mate with the first and second wing portions, respectively.

9. The vehicle seating assembly of claim 1, wherein the first and second brackets each comprise a wire portion defining first and second recesses, respectively, and the first and second wing portions each comprise at least one coupling configured to receive the wire portions.

10. The vehicle seating assembly of claim 9, wherein the at least one coupling defines a channel to accommodate the wire portion.

11. The vehicle seating assembly of claim 1, wherein the upper hood includes first and second end caps configured to couple with the first and second brackets.

12. A seating assembly, comprising:
    a frame defining an upper seat back;
    an upper hood comprising first and second ends;
    first and second brackets integral with the first and second ends of the upper hood; and
    a cushion assembly comprising first and second sides, wherein the first and second sides each define a groove configured to receive the first and second brackets, respectively, and wherein at least a portion of the first and second brackets is a polymeric material.

13. The seating assembly of claim 12 further comprising:
    a headrest coupled to the upper hood.

14. The seating assembly of claim 12, wherein the first and second brackets each comprise a U-shaped wire portion defining first and second recesses, respectively, and the first and second sides of the cushion assembly are disposed within the first and second recesses.

15. The seating assembly of claim 12, wherein the first and second brackets each comprise wing portions.

16. A seat back frame assembly, comprising:
   an upper hood comprising first and second ends;
   first and second brackets integral with the first and second ends of the upper hood, respectively; and
   wherein the first and second brackets each comprise wing portions configured to nest within a cushion assembly.

17. The seat back frame assembly of claim 16, wherein the cushion assembly defines recessed areas configured to receive the wing portions.

18. The seat back frame assembly of claim 17, wherein the recessed areas include shapes complementary to the wing portions.

19. The seat back frame assembly of claim 16 further comprising:
   a headrest coupled to the upper hood and defining a head restraint interface.

20. The seat back frame assembly of claim 16, wherein the wing portions of the first and second brackets comprise a polymeric material.

* * * * *